(12) United States Patent
Cutajar (10) Patent No.: US 9,438,712 B1
(45) Date of Patent: Sep. 6, 2016

(54) ASSIGNING TO A CALL A UNIQUE KEY ASSOCIATED WITH CALLER SPECIFIC DATA FOR RETRIEVING DATA FROM A DATABASE

(71) Applicant: Cox Communications, Inc., Atlanta, GA (US)

(72) Inventor: Louis Joseph Cutajar, Woodstock, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/831,700

(22) Filed: Mar. 15, 2013

Related U.S. Application Data

(63) Continuation-in-part of application No. 13/314,221, filed on Dec. 8, 2011, now abandoned.

(51) Int. Cl.
*H04M 1/56* (2006.01)
*H04M 1/57* (2006.01)

(52) U.S. Cl.
CPC .................................. *H04M 1/575* (2013.01)

(58) Field of Classification Search
CPC ....................................................... H04M 1/56

USPC ......... 379/142.06, 265, 207, 207.14, 207.15, 379/265.02, 114.29, 121.04, 88.2
See application file for complete search history.

(56) References Cited

U.S. PATENT DOCUMENTS

| | | | | |
|---|---|---|---|---|
| 5,867,495 A | * | 2/1999 | Elliott | H04L 65/4007 370/352 |
| 5,982,866 A | * | 11/1999 | Kowalski | H04M 3/42042 379/114.15 |
| 7,929,955 B1 | * | 4/2011 | Bonner | 455/415 |
| 8,370,211 B2 | * | 2/2013 | Bryant et al. | 705/26.3 |

* cited by examiner

*Primary Examiner* — Yosef K Laekemariam
(74) *Attorney, Agent, or Firm* — Merchant & Gould P.C.

(57) ABSTRACT

Caller specific information is linked to a call using a key for database retrieval of caller specific data. A pool of rolling Automatic Number Identification (ANI) codes is maintained. A call is received at a rolling ANI device. A rolling ANI is assigned to the call. The assigned rolling ANI is provided in a field identifying the call. The call and the assigned rolling ANI in the field identifying the call is routed to a call handler. A voice path and data associated with the call is received at the call handler. The data is parsed to determine a rolling ANI associated with the call. Caller specific information is obtained from a database record in a database identified by the rolling ANI. The obtained caller specific information is used to process the call seamlessly without prompting the caller for information in the database record associated with the rolling ANI.

9 Claims, 5 Drawing Sheets

ASSIGNING TO A CALL A UNIQUE KEY ASSOCIATED WITH CALLER SPECIFIC DATA FOR RETRIEVING DATA FROM A DATABASE

CROSS-REFERENCE TO RELATED APPLICATIONS

This patent application is a continuation-in-part application of U.S. patent application Ser. No. 13/314,221 filed Dec. 8, 2011, and titled "Assigning to a Call a Unique Key Associated with Caller Specific Data for Retrieving Data from a Database," the disclosure of which is expressly incorporated herein, in its entirety, by reference.

FIELD OF THE INVENTION

This disclosure relates in general to a contact center computer telephony integration system, and more particularly to assigning a unique key associated with the caller specific data to each call for database retrieval.

BACKGROUND

A core call center is often used to receive incoming calls. These calls may then be moved to out-sourced parties or other parties to handle the calls. More specifically, an automated, interactive voice response (IVR) system receives calls. The voice path and the data must be moved seamlessly to the third party that actually handles the call. Data may include customer account number, customer location information including customer site identifier, and service level information (i.e. types of services available in a calling area, services a caller uses, customer-specific information, etc.). Providing all the customer-specific data that is relevant to the call to the parties handling the calls enables a successful transfer of the data and the voice path. Accordingly, the customer can be handled efficiently and accurately, with no time wasted asking questions and looking up data that is previously known about that caller.

The voice path is forwarded with a key in a field, such as the Calling Line Identification (CLI) field. A mechanism is provided for counting calls and then sending a modified CLI with the call. Thus when a call arrives, a voice path and a key are provided to indicate that the data associated with the call may be found using a key to look up a designated record in a database. The database is a predefined database with the automatic number identification (ANI) providing the key. The ANI is used to identify the Directory Number (DN) of a calling subscriber, thus the ANI is used to obtain the data associated with the call.

Currently, the process is not performed efficiently. Several methods are used to provide the data to the other parties. For example, a trunk basis is used wherein the trunk that the call came in on is identified. For those skilled in the art, a trunk group is sent and it is identified as being on Channel 2. Computer telephony integration (CTI) information is exchanged between servers and communication nodes by means of CTI messages. For example, the CTI message may be used to identify the channel the truck number was on. Thus, this information allows the data and the call to be integrated. However, this method is very dependent on synchronization of both the trunks and the CTI messages so that the channel mapping enables integration of the data and the call. Nevertheless, the channel mapping would break down depending on volume. When time division multiplexing (TDM) was used, this method was acceptable because hard coded channels were used. When the switch to voice occurred, an algorithm was used to integrate the channel and the voice. However, the expected destination channel did not necessarily carry through to the other end as voice did not rely on a real cable extended from one place to another, but was implemented using data packets.

Accordingly, there is a need for assigning to a call a unique key associated with caller specific data for database retrieval.

SUMMARY OF THE INVENTION

To overcome the limitations described above, and to overcome other limitations that will become apparent upon reading and understanding the present specification, embodiments for providing a Rolling ANI application that allows specific customer data to be written to a repository with a unique key for later retrieval is disclosed.

A Rolling ANI system allows customer data to be written to a database with a unique key so that when a customer call is transferred to another market, or an outsource vendor, the specific customer data may be pulled with the call transfer for the agentto see. The key is delivered with the voice call via the CLI field, thus the agent system, i.e., vendor, at the far end knows where to go to immediately retrieve the data record associated with that specific customer's call. The Rolling ANI system accepts data from an ACD, or other CTI application, sets the Key that will be delivered with the voice call to its destination by overriding the PSTN CLI field. The RollingANI system may normalize the input data so that Line of Business (LOB) information may be sent back to the CCT to ensure proper routing.

A method for providing caller specific information with a call using a key for database retrieval of caller specific data is disclosed. The method includes maintaining a pool of rolling Automatic Number Identification (ANI) codes at a rolling ANI device, sending a call to the rolling ANI device, assigning a rolling ANI to the call, providing the assigned rolling ANI in a field identifying the call and routing the call and the assigned rolling ANI in the field identifying the call to a call handler.

In another embodiment, a method for processing a call using caller specific information is disclosed. The method includes receiving a voice path and data associated with a call, parsing the data to determine a rolling ANI associated with the call, obtaining caller specific information from a database record in a database identified by the rolling ANI and using the obtained caller specific information to process the call seamlessly without prompting the caller for information in the database record associated with the rolling ANI.

In another embodiment, another method for processing a call using caller specific information is disclosed. The method includes maintaining a pool of rolling Automatic Number Identification (ANI) codes at a rolling ANI device, sending a call to the rolling ANI device, assigning a rolling ANI to the call, providing the assigned rolling ANI in a field identifying the call, routing the call and the assigned rolling ANI in the field identifying the call to a call handler, receiving a voice path and data associated with the call at the call handler, parsing the data to determine a rolling ANI associated with the call, obtaining caller specific information from a database record in a database identified by the rolling ANI and using the obtained caller specific information to process the call seamlessly without prompting the caller for information in the database record associated with the rolling ANI.

In another embodiment, a system for enabling call processing using caller specific information is disclosed. The system includes an automatic call distributor that includes automatic call distributor memory for storing data and an automatic call distributor processor, coupled to the automatic call distributor memory, the processor maintaining a pool of rolling Automatic Number Identification (ANI) codes in the memory, receiving a call, obtaining caller specific information from the caller associated with the call, assigning to the call a rolling ANI from the pool of rolling ANI codes, storing the obtained caller specific information in a database record identified by the assigned rolling ANI, providing the assigned rolling ANI in a field identifying the call and routing the call and the assigned rolling ANI in the field identifying the call to a call handler and a computer telephony integration server, coupled to the automatic call distributor, for handling calls forwarded by the automatic call distributor, the computer telephony integration server including computer telephony integration server memory for storing retrieved data and a computer telephony integration server processor, coupled to the computer telephony integration server memory, for receiving a voice path and data associated with the call, parsing the data to determine a rolling ANI associated with the call, obtaining caller specific information from a database record in a database identified by the rolling ANI and using the obtained caller specific information to process the call seamlessly without prompting the caller for information in the database record associated with the rolling ANI.

In another embodiment, an automatic call distributor system for enabling call processing using caller specific information is disclosed. The automatic call distributor system includes automatic call distributor memory for storing data and an automatic call distributor processor, coupled to the automatic call distributor memory, the processor maintaining a pool of rolling Automatic Number Identification (ANI) codes in the memory, receiving a call, obtaining caller specific information from the caller associated with the call, assigning to the call a rolling ANI from the pool of rolling ANI codes, storing the obtained caller specific information in a database record identified by the assigned rolling ANI, providing the assigned rolling ANI in a field identifying the call and routing the call and the assigned rolling ANI in the field identifying the call to a call handler.

In another embodiment, a computer telephony integration server for handling calls is disclosed. The computer telephony integration server includes computer telephony integration server memory for storing retrieved data and a computer telephony integration server processor, coupled to the computer telephony integration server memory, for receiving a voice path and data associated with a call, parsing the data to determine a rolling ANI associated with the call, obtaining caller specific information from a database record in a database identified by the rolling ANI and using the obtained caller specific information to process the call seamlessly without prompting the caller for information in the database record associated with the rolling ANI.

In another embodiment, a computer-readable storage medium that includes instructions, for providing caller specific information with a call using a key for database retrieval of caller specific data is disclosed. The instructions include maintaining a pool of rolling Automatic Number Identification (ANI) codes at a rolling ANI device, sending a call to the rolling ANI device, assigning a rolling ANI to the call, providing the assigned rolling ANI in a field identifying the call, routing the call and the assigned rolling ANI in the field identifying the call to a call handler, receiving a voice path and data associated with the call at the call handler, parsing the data to determine a rolling ANI associated with the call, obtaining caller specific information from a database record in a database identified by the rolling ANI and using the obtained caller specific information to process the call seamlessly without prompting the caller for information in the database record associated with the rolling ANI.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a contact center computer telephony integration (CTI) system, herein referred to as the Rolling ANI system, which allows a call to be assigned to a particular automatic number identification (ANI) based on a value that is passed to the system. The purpose of integrating a call to a specific ANI is to use this ANI as a key via the calling line identification (CLID) override capabilities of the automatic call distributor (ACD) when delivering a call off premise.

The Rolling ANI is delivered in the CLID of the Integrated Services Digital Network (ISDN) message set and can be retrieved at the receiving site to leverage a database call to integrate the customer/caller specific data path to the voice path. This application may allow the call center to create a pool of Rolling ANIs on the ACD and iteratively step through each ANI and assign a call as necessary. This ensures that each call will have a unique key associated with the caller-specific data.

Figure 1:
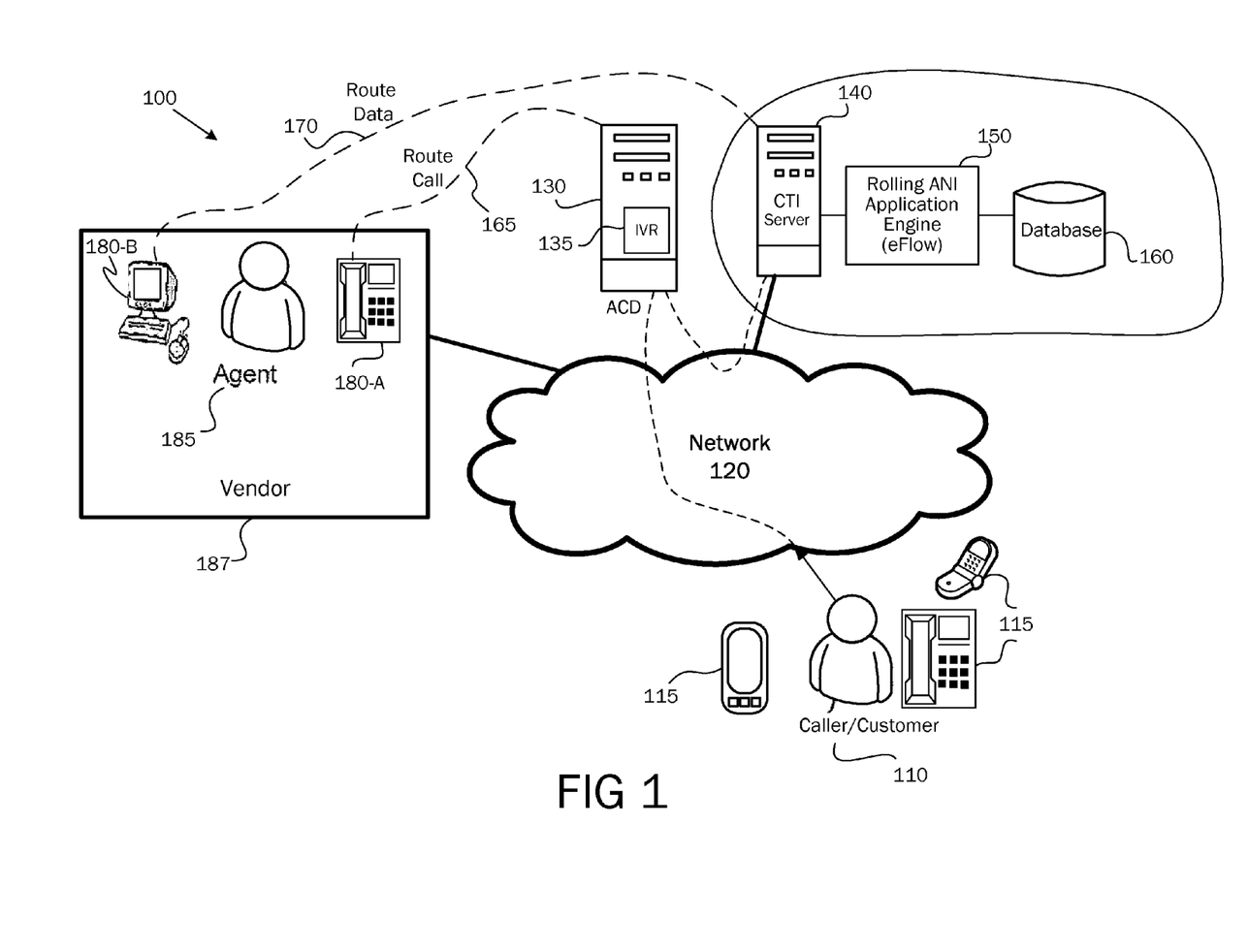
FIG. 1 illustrates a custom telephony routing system environment that supports a Rolling ANI system according to one embodiment.

FIG. 1 illustrates a custom telephony routing system environment 100 that supports a Rolling ANI system according to one embodiment. As illustrated, the environment 100 may include caller terminals 115, 180-A, and 180-B, a network 120, an automatic call distribution (ACD) server 130, a computer telephony integration (CTI) server 140, and a Rolling ANI application engine 150 (also referred to herein as an eFlow application or system). It may be noted that in other implementations, environment 100 may include fewer, additional or different devices than those illustrated in FIG. 1.

Each of terminals 115, 180-A and 180-B may include a user device having communication capability such as a telephone, cell phone, a mobile computing device (for example a smart phone), a computer, etc. Terminal 115 may be operated by a caller 110 (e.g., a customer) and terminals 180-A and 180-B may be operated by a call center agent 185. Network 120 may include any type of network, such as a wide area network, a local area network, a telephone network (i.e. a public switched telephone network (PSTN) or a wireless network), the Internet, a private network, or a combination of networks, etc. Those skilled in the art recognize the Network 120 may include at least one device to handle a call from terminals.

The ACD server 130 may include a device that distributes incoming calls to one or more terminals 180-A, or agents 185. The ACD server may manage calls, queues, agent groups, caller service requests. It may also provide for computer calls from the Web, email, fax, etc. The IVR 135 provides caller service support through an interactive voice menu system. For example, the caller 110 may indicate a response to a voice prompt using a telephone dial pad or open dialog spoken by the caller. The CTI 140 server may include a device that provides an interaction between caller 110 contact channels and a computational device, such as a computer 180-B. Thus, the CTI server 140 may provide call-related information to a terminal 180-B for visual display. CTI server 140 may route a call to its proper extension and/or poll one or more back-end databases to relay call information to the appropriate terminal 180-B.

The Rolling ANI Application Engine 150 be located on a call data server and may include a device that manages the data and one or more databases 160. In one implementation, the call data may be managed (i.e. stored, retrieved, and processed) based on a unique key. The Rolling ANI application engine 150, sometimes referred to herein as eFlow, writes the key and eight pieces of data to the database or repository 160. The database is provided for the vendor 187 to lookup the data associated with a call according to the key. Trunk lines provide the transmission channel between two points, for example, the customer 110 and the agent 185 servicing the customer call. Accordingly, a call is received and the customer/caller 110 is validated by the system. All the information about the customer 110 is gathered. The call is provided to the Rolling ANI application server 150. Calls are counted by the Rolling ANI application and roll between 1 and a predetermined number, M. For example, if M is 10, the system count calls from 1 to 10 and resets the counter repeatedly providing a rolling pool of ANIs to be used as calls come in. Those skilled in the art recognize that embodiments are not meant to be limited to a repeating call count, but that a hard ANI may be used. All of the data associated with a call is written to a database 160 with the unique key being tied to the assigned rolling ANI.

Multiple lines of business may be outsourced to the vendor 187 for call handling. Thus, it is important that the vendor 187 knows the call to which the data is associated and the line of business where the vendor 187 needs to route the call. The ANI is overwritten with this key once the call is delivered. The voice path routes 165 to the intended destination. The vendor 187 has the unique key and thus knows immediately to look up the associated data record in the database 160. The vendor 187 is therefore able to integrate the voice 165 and the data 170 to handle the call seamlessly without having to prompt the customer 110 for additional information, thereby preventing additional time being wasted. The integration of the voice path and the data associated with the call occurs quickly so by the time the count rolls over to the same count again, the data in the database associated with the first call is no longer needed.

Accordingly, the Rolling ANI application is the custom telephony routing system that receives a value returned from the call count application and maps the received value to a predefined ANI in the Rolling ANI pool created on the ACD. To invoke this eFlow via the ACD, a ROLLINGANI subtype can be issued from the local call control table (CCT). The Rolling ANI application will set the proper Line of Business (LOB) for the call, map the proper Rolling ANI Key, write the Key and eight pieces of pertinent data to the Repository, and return the Rolling ANI Key in Variable A. The CCT can then dial out the call to the vendor 187 on the specific Market/LOB and the Key will subsequently be delivered in the CLID field of the ISDN message set for their use.

Figure 2:
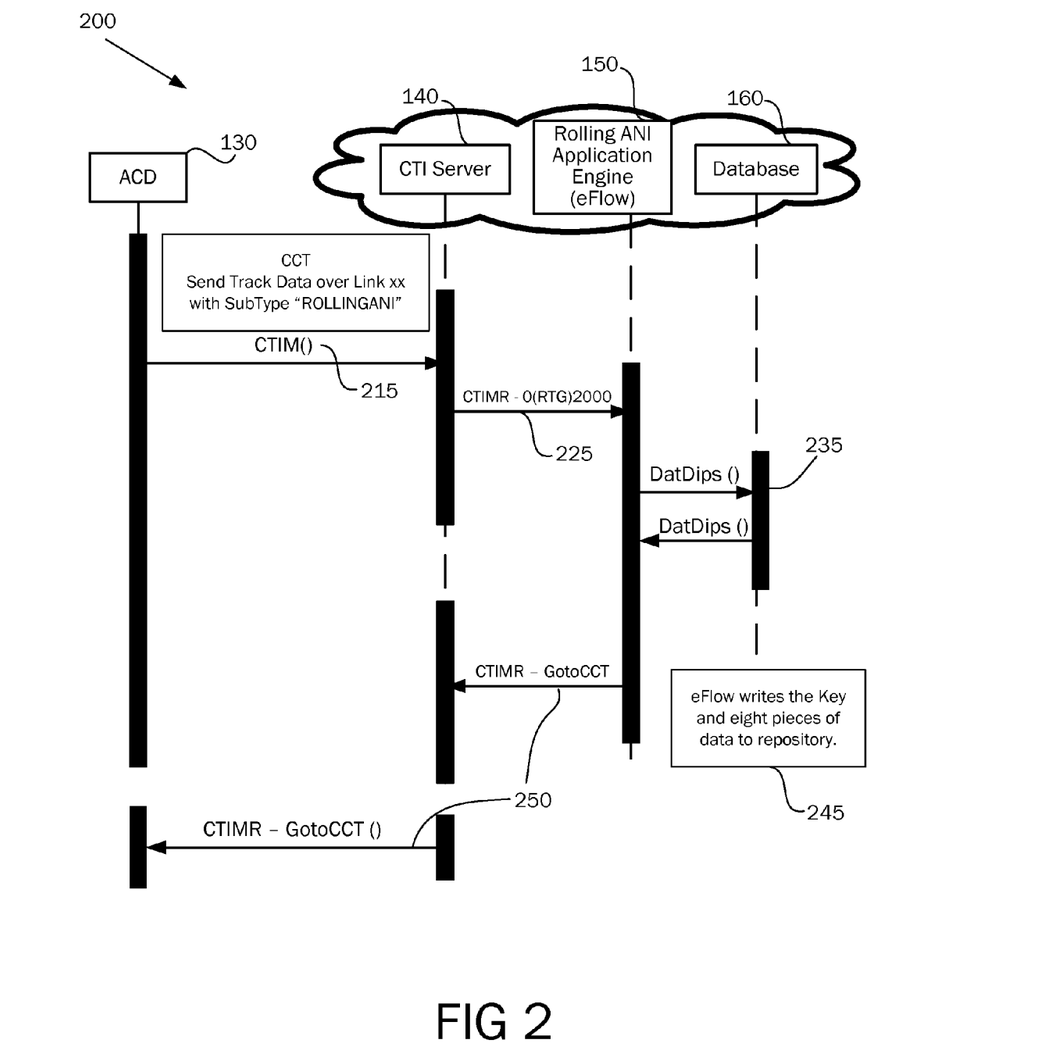
FIG. 2 is a sequence chart that provides an overview of the call flow for the Rolling ANI application according to one embodiment, FIG. 3 provides a flowchart of the Rolling ANI eFlow according to an embodiment.

FIG. 2 is a sequence chart 200 that provides an overview of the call flow for the Rolling ANI application according to one embodiment. The eFlow 150, CTI 140 and Database 160 are shown together on the same machine. However, those skilled in the art recognize that embodiments may provide these elements separately. There are 2 types of CCT(s) used for calling the Rolling ANI application: (1) the CCT that invokes the Application and (2) the CCTs that the call is redirected to as a result of the application selecting a Rolling ANI. To first call the application a CCT must invoke a Route Request to the eFlow 150 system. This value set in the SUBTYPE is a defined as ROLLINGANI. The CCT will issue a computer telephony integration module (CTIM) message using the SendTrackData step over a data interlink to the call management information (CMI) server with a subtype of "ROLLINGANI" 215. The CMI server will match the subtype to a routing device and forward the request to the subsystem where the eFlow system 150 will process the request 225 and return the call flow to the specific CCT 250. Thus, the ACD 210 may send a CTI message 215 over to the CTI server 140, which then sends the data received 225 to the eFlow engine 150. The eFlow engine 150 manipulates the data by using the obtained customer data. The message not only includes the Key, but also includes the customer data that the ACD 130 has gathered over the course of the call. This data 235 is written to the database 160. Thus, eFlow writes the Key and eight pieces of data to repository 160.

The key is the RollingANI that was assigned to the call. For example, in the case of Pensacola, Fla., the RollingANI starts at one 7-digit number 1350001. The iterative process is managed by a Call Counter application. A key is incremented by 1000, 2000, 3000, etc. so that number in that position will represent the line of business, for example, Ser. No. 13/510,002. The first three digits is the site ID and the fourth digit represents the line of business. Thus, the fourth digit is a 1, so the line of business may be Data Tech. This may be mapped to an internal line of business code. For example, DataTech represented by the 1 as the fourth digit is actually mapped to an internal line of business code 7500004.

The CCT that the call is redirected to as a result of the Rolling ANI application 150 processing the call is part of a predefined set of CCTs. To ensure each CCT entry will have a one-to-one relationship with an ACD Application, a common index number is assigned to each record within the table, for example 2401 is assigned to both CCT and Application. Each Application is mapped to a specific Rolling ANI hardcoded into the CLID field of that application.

The 7 digit Rolling ANI/Key may be composed of the location code in the first three digits and the common index. For example, 135 may refer to Pensacola, Fla. This serves to create a pool of ANIs to 'roll' through and integrate to a call for later use in a database call.

The following table shows mapping of Rolling ANIs to a CCT and to Applications. As shown the CCT and Application are the same. The Rolling ANI/Key has the same common index as shown by the last digits.

| CCT | Application | Rolling ANI/Key |
|---|---|---|
| 2401 | 2401 | 1350001 |
| 2402 | 2402 | 1350002 |
| 2403 | 2403 | 1350003 |
| 2404 | 2404 | 1350004 |
| 2405 | 2405 | 1350005 |
| 2406 | 2406 | 1350006 |
| 2407 | 2407 | 1350007 |
| 2408 | 2408 | 1350008 |
| 2409 | 2409 | 1350009 |
| 2410 | 2410 | 1350010 |

Figure 3:
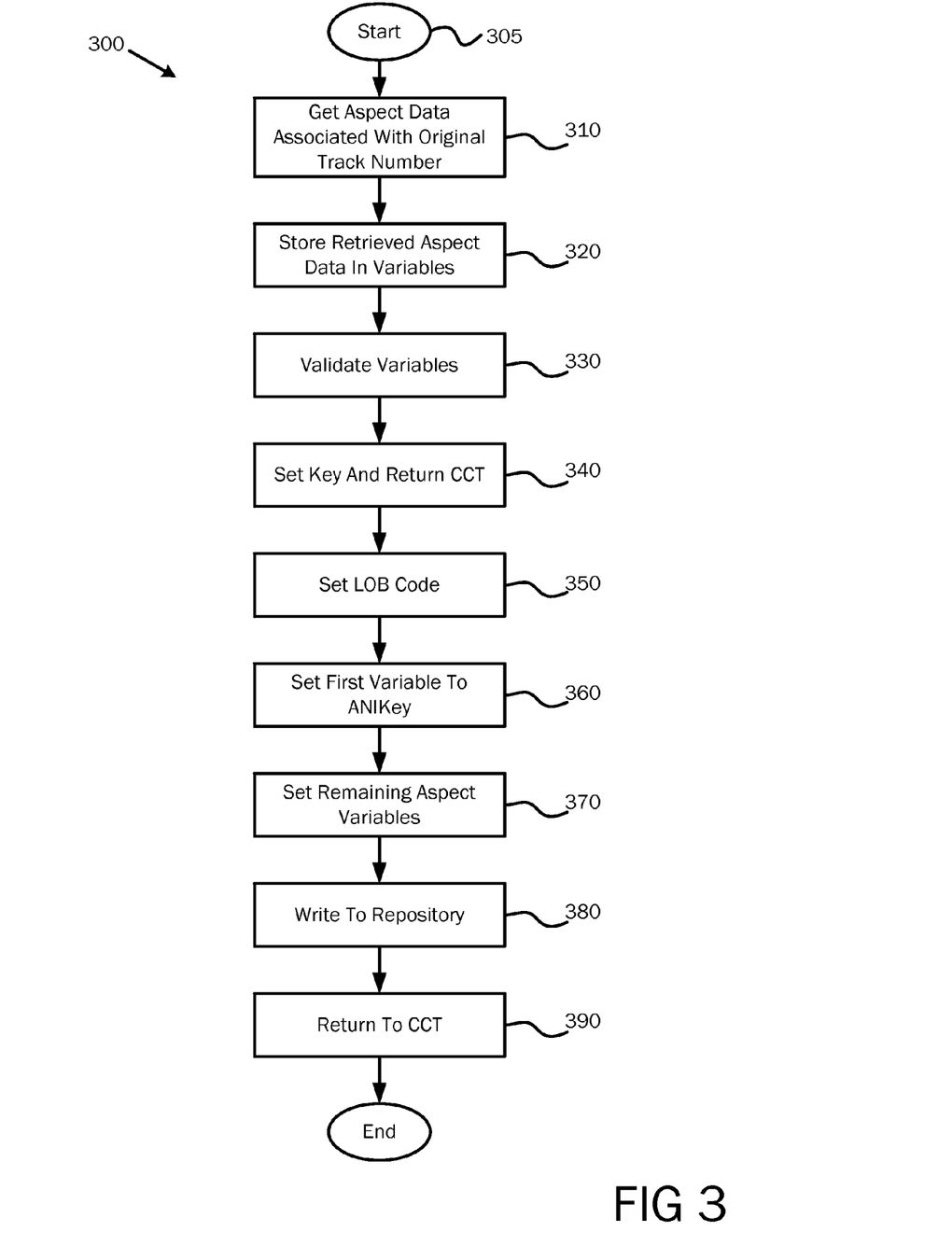

FIG. 3 provides a flowchart 300 of the Rolling ANI eFlow according to an embodiment. The call flow has been handed off to the CTI server and RollingANI code has been invoked. As shown in FIG. 3, the process allows customer data to be written to a database with a unique key so that when a Customer call is transferred to another market, or an outsource vendor, the specific customer data may be retrieved with the call transfer for the agent to see. The key is delivered with the voice call via the CLI field so the agent knows where that specific customer call's data record can be immediately retrieved. Start (305) begins the process 300 and may provide initial error trapping. Error trapping may be split into three categories: CTI errors, database errors, and expression errors. CCT variables associated with the original track number (310) are retrieved and passed into the eFlow. Hard coded parameters are passed into the eFlow engine 150 such as the customer account number, the track number, and other specific data and stored in variables (320). Variables may need to be validated (330) so the eFlow contains the logic to validate specific variables. For example, Variable A may need to be in the proper format required to return the Rolling ANI Key in the proper positions. Therefore, if the Rolling ANI Key needs to be returned in positions 11-17 of Variable A, this may be accomplished by first checking the length of Variable A. If the length of variable A is less than a predetermined number Y, e.g., 10, the eFlow may need to pad Variable A with as many Os as necessary to ensure the first Y positions are populated so a later concatenation of the Rolling ANI Key will be in the proper ordinance. This may be accomplished by a simple loop that pads a "0" and then checks the length again.

The Set Key and Return CCT step (340) of the eFlow contains the core logic used to create the Rolling ANI Key and return the call flow to the proper CCT/system combination that will result in the outbound call overriding the CLID field with the Key. The index value may be stored in a variable, Variable C, which was passed in from the Call Count application (a CTI application leveraged to iteratively step through the Rolling ANI pool). This value represents the Index for the Rolling ANI to be selected. It may accomplish this by adding the Index value to the predetermined Rolling ANI Key and adding the Index value to 2400 for example (see table above).

The Rolling ANI Key includes:
<Site ID||nnnn>, where nnnn represents the current Nth call Set LOB Code step (350) of the eFlow sets Variable C to the value of the LOB Code. This was preset in the calling CCT and was overwritten by Call Count application. To compensate for this, in the CCT all 7 digits in Variable C are used and the SITEID concatenated with 0000 is added to the Index Value. Then x000 is added where x represents the code for a line of business. For example, if Data Tech is 1, 1000 is added, or 2000 is added for another LOB such as Video Tech. This makes the $4^{th}$ position of variable C the indicator for LOB. Again, those skilled in the art recognize that embodiments are not meant to be limited to a particular number of digits. The particular number of digits or position may be altered without departing from the scope of the embodiments described herein.

Thus, the CTI Variable C from the CCT will contain:
(<Site ID||nnnn>+x000 or x000),
where nnnn represents the current Nth call and x is the LOB code Accordingly, the key is the RollingANI that was assigned to the call. For example, in the case of Pensacola, Fla., the RollingANI starts at one 7-digit number 1350001 as shown above. The iterative process is managed by Call Count application. A key is incremented by 1000, 2000, 3000, etc. so that number in that position will represent the line of business, e.g., 13510002. The first three digits is the site ID and the fourth digit represents the line of business. Thus, the fourth digit is a 1, so the line of business is DataTech. This may be mapped to an internal line of business code. For example, DataTech represented by the 1 as the fourth digit is actually mapped to an internal line of business code such as 7500004.

The first variable (variable A) is set back to the original value passed in concatenated with the Rolling ANI Key (360). The remaining Variables (variables B, D, E) are also set back to the original values to be passed back to CCT (370).

The Write to Repository step (380) of the eFlow process writes the 8 pertinent caller specific data fields and key to the local Repository for retrieval at a later time. The data fields are as follows:
  Key is a Rolling ANI for integrating voice path and data
  Track Number is the Track Number used for escalation notes
  Call ID is the Call ID used for building CTI transfer back messages
  Variable A is the original variable A concatenated with the Rolling ANI Key
  Variable B is the customer account number for database calls
  Variable c is the LOB Code for identification and screen pops (a screen pop is a window or dialog box that autonomously appears on the desktop, displaying information for a call simultaneously sent to that agent's telephone)
  Variable D is the Site ID and last 4 of original DNIS for ICOMs calls
  Variable E is other customer data
The application engine (eFlow) 150 may return control of the call to the proper CCT as determined by the application (390).

Figure 4:
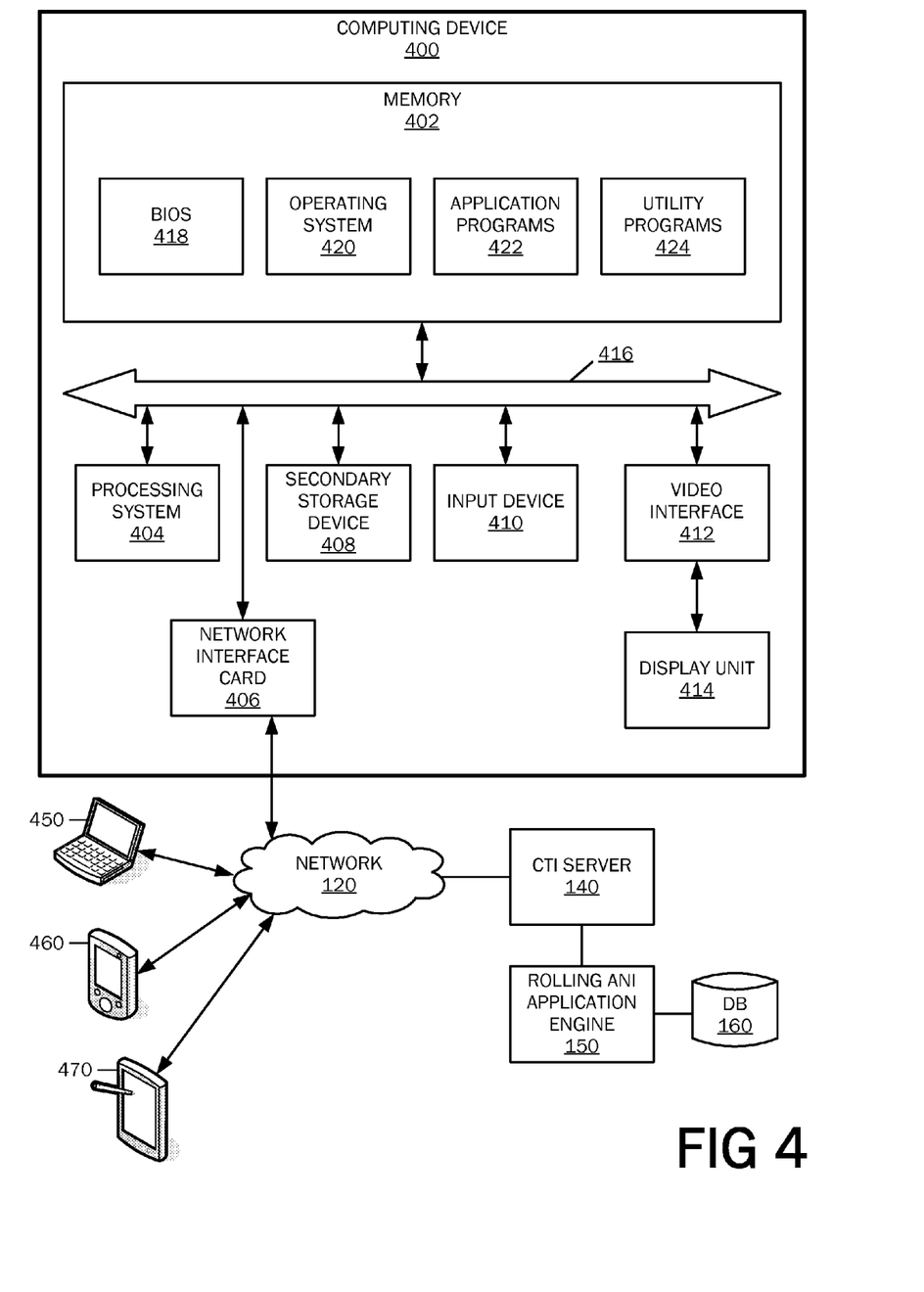
FIG. 4 is a block diagram illustrating example physical components of a computing device and system architecture for providing Rolling ANI.

FIG. 4 illustrates an example computing device 400 with which embodiments of the present invention may be implemented. In some embodiments, the CTI server 140, the Rolling ANI Application Engine 150, and/or the Database 160 may be implemented using one or more computing devices like the computing device 400. It should be appreciated that in other embodiments, the CTI server 140, the Rolling ANI Application Engine 150, and/or the Database 160 may be implemented using computing devices having hardware components other than those illustrated in the example of FIG. 4.

Computing devices may be implemented in different ways in different embodiments. For instance, in the example of FIG. 4, the computing device includes a processing system 404, memory 402, a network interface 406, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules.

The memory 402 includes one or more computer-readable storage media capable of storing data and/or computer-executable instructions. Memory 402 thus may store the computer-executable instructions that, when executed by processor 404, cause the Rolling ANI application engine 150 to assign a unique key to customer data as described above with reference to FIGS. 1-3 and store customer specific data to database 160.

In various embodiments, the memory 402 is implemented in various ways. For example, the memory 402 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more Intel Core microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface card 406. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 408 includes one or more computer-readable storage media, and may store data and computer-executable instructions not directly accessible by the processing system 404. That is, the processing system 404 performs an I/O operation to retrieve data and/or computer-executable instructions from the secondary storage device 408. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs 422 that, when executed by the processing system 404, cause the computing device 400 to provide applications to users. According to an embodiment, memory 402 may store a rolling ANI application engine 150. The memory 402 also stores one or more utility programs 424 that, when executed by the processing system 404, cause the computing device 400 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 4 may be integrated onto a single integrated circuit. When operating via such a single integrated circuit, the functionality, described herein, with respect to the rolling ANI application engine 150 may be operated via application-specific logic integrated with other components of the computing device/system 400 on the single integrated circuit.

FIG. 4 illustrates a system architecture 400 for providing a rolling ANI application that assigns a unique key associated with the caller specific data to each call for database retrieval, as described above. Calls made by a calling party, interacted with or edited in association with a rolling ANI application engine 150 may be stored in different communication channels or other storage types. The rolling ANI application engine 150 may use any of different communication channels or other storage types or the like for enabling data utilization, as described herein. A server 140 may provide the ANI key to clients. As one example, a server may be a web server providing the rolling ANI application engine 150 over the web. Server 140 may provide the ANI key over the web to clients through a network 120. Examples of clients that may obtain the caller-specific information include computing device 450, which may include any general purpose personal computer (such as computing device 400), a tablet computing device 470 and/or mobile computing device 460, such as smart phones.

Figure 5A:
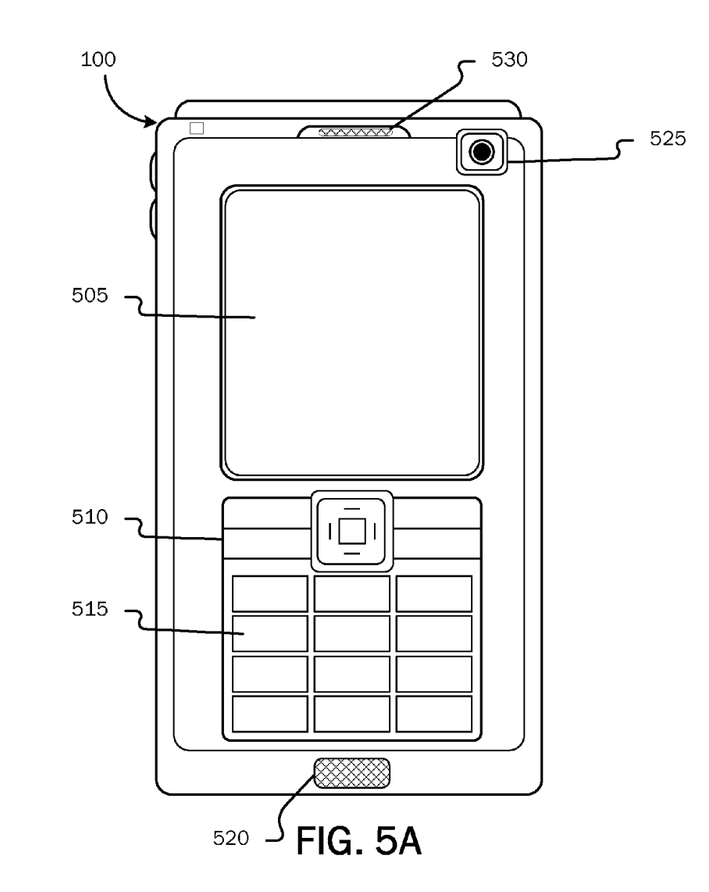
FIGS. 5a-b illustrate a suitable mobile computing environment, for example, a mobile computing device, a smart phone, a tablet personal computer, a laptop computer, and the like, with which embodiments may be practiced.
Figure 5B:
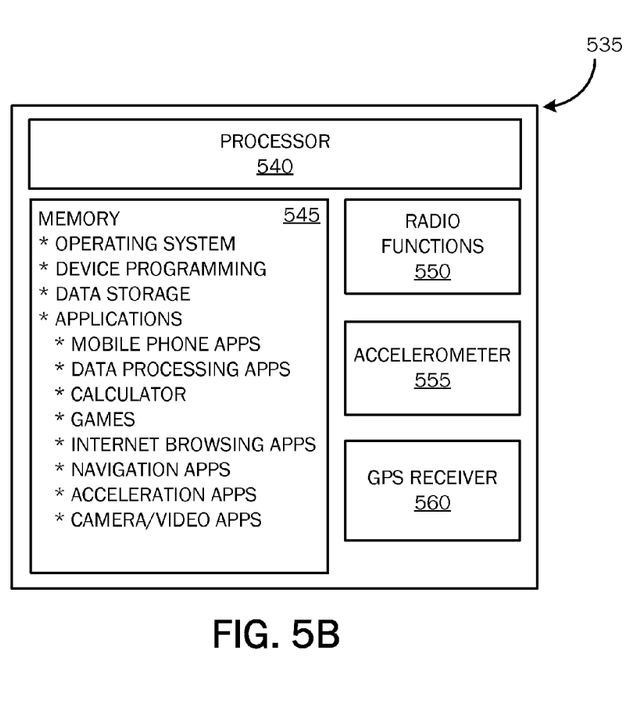

FIGS. 5A and 5B are block diagrams of a mobile computing device with which embodiments of the present invention may be practiced. The mobile computing device 500 is illustrative of any suitable device, such as a mobile telephone, personal digital assistant (PDA), or handheld computer, operative to send, receive and process wireless communications according to embodiments of the present invention. A display screen 505 is operative for displaying a variety of information such as information about incoming and outgoing communications, as well as, a variety of data and displayable objects, for example, text, alphanumeric data, photographs, and the like.

Data input to the device 500 may be performed via a variety of suitable means, such as, touch screen input via the display screen 505, keyboard or keypad input via a data entry area 510, key input via one or more selectable buttons or controls 515, voice input via a microphone 520 disposed on the device 500, photographic input via a camera 525 functionality associated with the mobile computing device, or any other suitable input means. Data may be output via the device 500 via any suitable output means, including but not limited to, display on the display screen 505, audible output via an associated speaker 530 or connected earphone system, vibration module for providing tactile output, and the like.

Referring now to FIG. 5B, operational unit 535 is illustrative of internal operating functionality of the mobile computing device 500. A processor 540 is illustrative of a general purpose computer processor for processing incoming and outgoing data and communications and controlling operation of the device and associated software applications via a mobile computing device operating system. Memory 545 may be utilized for storing a device operating system, device programming, one or more stored applications, for example, mobile telephone applications, data processing applications, calculators, games, Internet browsing applications, navigation applications, acceleration applications, camera and/or video applications, etc. Other applications may be loaded into memory 562 and run on the mobile computing device 502, including the rolling ANI application engine 150, described herein.

Mobile computing device 500 may contain an accelerometer 555 for detecting acceleration, and can be used to sense orientation, vibration, and/or shock. Mobile computing device 500 may contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennae, for allowing the device 500 to communicate with other communication devices and systems via a wireless network. Radio functions 550 may be utilized to communicate with a wireless or WIFI-based positioning system to determine a device's 500 location.

Although described herein in combination with mobile computing device 500, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing caller specific information with a call using a key for database retrieval of caller specific data, comprising:
   maintaining a pool of rolling Automatic Number Identification (ANI) codes at a rolling ANI device;
   sending a call to the rolling ANI device;
   assigning, via a service provider, a rolling ANI to the call;
   overriding a Calling Line Identification (CLI) field to provide the assigned rolling ANI in the CLI field with the call;
   routing the call and the assigned rolling ANI in the CLI field with the call to a call handler; and
   utilizing the assigned rolling ANI from the service provider in the CLI field to obtain caller specific information from the caller associated with the call.

2. The method of claim 1 further comprising:
   initially receiving the call at a core call center;
   validating a caller associated with the call; and
   storing the obtained caller specific information in a database record identified by the assigned rolling ANI.

3. The method of claim 1, wherein the routing the call and the assigned rolling ANI in the CLI field with the call to a call handler comprises routing the call to a call handler for managing interaction with the caller using information from a database record identified by the rolling ANI.

4. The method of claim 1, wherein the assigning a rolling ANI to the call further comprises assigning a rolling ANI that includes identification of a line of business associated with the call and identification of a geographic area associated with the caller.

5. The method of claim 1, wherein the assigning a rolling ANI to the call further comprises using a counter to provide a cyclic maximum count used to cycle through the pool of rolling ANI codes.

6. A method for processing a call using caller specific information, comprising:
   receiving a voice path and data associated with a call;
   parsing the data to determine a rolling ANI, via a service provider, and overriding a Calling Line Identification (CLI) field to provide the rolling ANI in the CLI field associated with the call;
   obtaining caller specific information from a database record in a database identified by the rolling ANI from the service provider in the CLI field; and
   using the obtained caller specific information to process the call seamlessly without prompting the caller for information in the database record associated with the rolling ANI.

7. The method of claim 6, wherein the parsing the data to determine a rolling ANI associated with the call further comprises identifying from the rolling ANI a line of business associated with the call and a geographic area associated with the caller.

8. A method for processing a call using caller specific information, comprising:
   maintaining a pool of rolling Automatic Number Identification (ANI) codes at a rolling ANI device;
   sending a call to the rolling ANI device;
   assigning, via a service provider, a rolling ANI to the call;
   overriding a Calling Line Identification (CLI) field to provide the assigned rolling ANI in the CLI field with the call;
   routing the call and the assigned rolling ANI in the CLI field with the call to a call handler;
   receiving a voice path and data associated with the call at the call handler;
   parsing the data to determine a rolling ANI associated with the call;
   obtaining caller specific information from a database record in a database identified by the rolling ANI from the service provider in the CLI field; and
   using the obtained caller specific information to process the call seamlessly without prompting the caller for information in the database record associated with the rolling ANI.

9. A computer-readable storage device including instructions, that when executed provides caller specific information with a call using a key for database retrieval of caller specific data, the instructions comprising:
   maintaining a pool of rolling Automatic Number Identification (ANI) codes at a rolling ANI device;
   sending a call to the rolling ANI device;
   assigning, via a service provider, a rolling ANI to the call;
   overriding a Calling Line Identification (CLI) field to provide the assigned rolling ANI in the CLI field with the call;
   routing the call and the assigned rolling ANI in the CLI field with the call to a call handler;
   receiving a voice path and data associated with the call at the call handler;
   parsing the data to determine a rolling ANI associated with the call;
   obtaining caller specific information from a database record in a database identified by the rolling ANI from the service provider in the CLI field; and
     using the obtained caller specific information to process the call seamlessly without prompting the caller for information in the database record associated with the rolling ANI.

* * * * *